(12) United States Patent  
Cern

(10) Patent No.: US 6,975,210 B2  
(45) Date of Patent: Dec. 13, 2005

(54) ARRANGEMENT OF AN INDUCTIVE COUPLER FOR POWER LINE COMMUNICATIONS

(75) Inventor: Yehuda Cern, Brookline, MA (US)

(73) Assignee: Ambient Corporation, Newton, MA (US)

( * ) Notice: Subject to any disclaimer, the term of this patent is extended or adjusted under 35 U.S.C. 154(b) by 64 days.

(21) Appl. No.: 10/721,612

(22) Filed: Nov. 25, 2003

(65) Prior Publication Data

US 2004/0104798 A1 Jun. 3, 2004

Related U.S. Application Data

(60) Provisional application No. 60/429,172, filed on Nov. 26, 2002.

(51) Int. Cl.[7] ............................................. H04M 11/04
(52) U.S. Cl. ............................ 340/310.01; 340/310.07; 340/310.08
(58) Field of Search ....................... 340/310.01, 310.03, 340/310.05, 310.06, 310.07, 310.08; 333/100

(56) References Cited

U.S. PATENT DOCUMENTS 4,075,675 A * 2/1978 Burkett et al. ................ 361/48
4,709,339 A * 11/1987 Fernandes .................... 700/293
4,855,671 A * 8/1989 Fernandes .................... 324/127
5,949,327 A * 9/1999 Brown .................... 340/310.01
6,255,935 B1 * 7/2001 Lehmann et al. ....... 340/310.07
6,452,482 B1   9/2002 Cern ....................... 340/310.01
6,563,420 B2 * 5/2003 Brown et al. .......... 340/310.01
6,577,230 B1 * 6/2003 Wendt et al. ........... 340/310.01

OTHER PUBLICATIONS

International Search Report dated Dec. 9, 2004.

* cited by examiner

*Primary Examiner*—John Tweel  
(74) *Attorney, Agent, or Firm*—Ohlandt, Greeley, Ruggiero & Perle, LLP

(57) ABSTRACT

There is provided an arrangement of components for use in a power line communication system. The arrangement includes (a) an inductive coupler having a core with an aperture through which a coaxial power cable is routed, where the coaxial power cable has a center conductor and an outer conductor; and (b) a lead being routed through the aperture, where the lead connects the outer conductor to a termination.

18 Claims, 3 Drawing Sheets

ARRANGEMENT OF AN INDUCTIVE COUPLER FOR POWER LINE COMMUNICATIONS

CROSS-REFERENCE TO RELATED APPLICATIONS

The present application is claiming priority to U.S. Provisional Application No. 60/429,172, filed Nov. 26, 2002.

BACKGROUND OF THE INVENTION

1. Field of the Invention

The present invention relates to power line communications (PLC), and more particularly, to placement of an inductive coupler around a cable having a shield or sheath of neutral conductors. The present invention is particularly advantageous in a case where the cable is an underground power line.

2. Description of the Related Art

In a power line communication system, a data signal may be coupled onto and off of a power line via an inductive coupler, such as described in U.S. Pat. No. 6,452,482. Inductive couplers may be placed around an uninsulated phase conductor or an insulated phase conductor. However, in underground power distribution systems, there is often no physical access to, or space around, a section of a phase conductor or a center conductor in the vicinity of a cable termination. Even when such access exists, work rules may require de-energizing the cable prior to attachment of the coupler. This process is inconvenient and requires personnel at both ends of a cable segment, and may sometimes affect service to power customers.

Many underground cables are built with a solid coaxial shield, grounded at each end, the main purpose of which is to provide shielding. Other underground cables are built with a plurality of wires wound spirally around an insulated core, where the plurality of wires serve as a neutral conductor. This shield or neutral conductor sheath is terminated just short of the end of a center conductor. The length of the unsheathed center conductor can be very short, often too short to allow installation of an inductive coupler.

In contrast, a shielded or sheathed cable segment located slightly away from the cable termination is generally available for coupler attachment while the cable is energized. However, efficiency of inductive coupling is reduced by the cable's shield or sheath. This is due to signal current induced in the shield or sheath, of magnitude similar to that in the center conductor, but of opposite phase. Since an output of the inductive coupler is proportional to a phasor sum of current passing through an aperture of the coupler, signal currents in the center conductor and shield or sheath conductors will tend to cancel, greatly reducing amplitude of a coupled signal.

SUMMARY OF THE INVENTION

An embodiment of the present invention is a placement of an inductive coupler around a sheathed or shielded coaxial power cable. The placement includes routing a wire that terminates the sheath or shield as a third conductor through an aperture of the coupler.

DESCRIPTION OF THE INVENTION

In a coaxial cable having a center conductor that carries a signal current, a concentric shield (or sheath) serves as a return circuit, carrying a current of similar magnitude but opposite phase to the signal current. When such a cable is passed through a core of a an inductive coupler, magnetic fluxes generated by the two currents tend to cancel, greatly reducing a ratio of current in a secondary winding of the coupler to current in the cable's center conductor. Thus, placing an inductive coupler around a shielded coaxial cable provides poor coupling to signal currents carried in the central conductor.

Consider a wire that connects the shield to its termination as a "drain" wire, completing a circuit for noise signals or power current to electrical ground. Routing the drain wire back through the coupler passes the current in the shield through the coupler core twice, once in the shield in one direct and once through the drain wire in the opposite direction, and essentially cancels the effect of the shield current.

Figure 1:
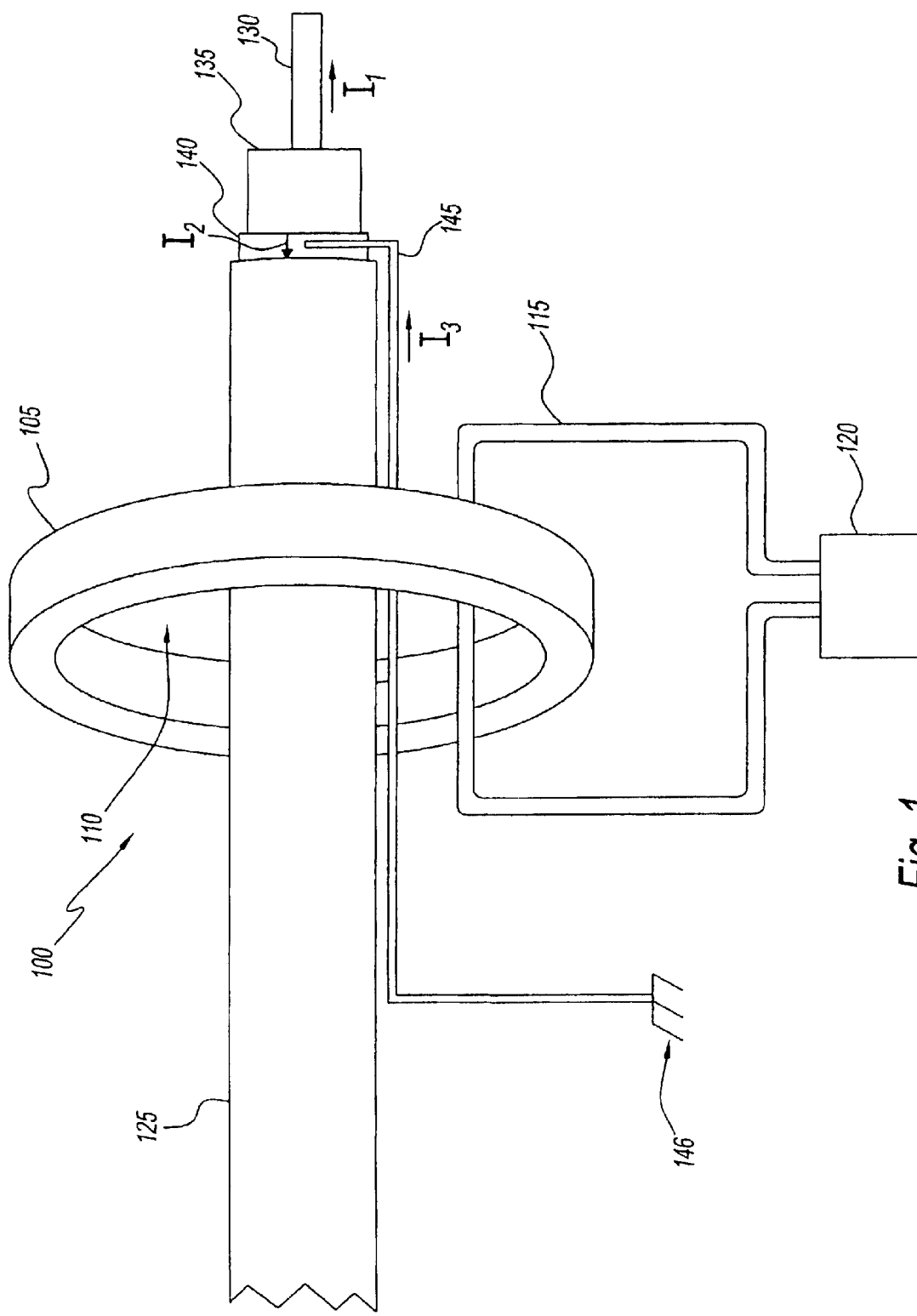
FIG. 1 is a diagram of an arrangement of an inductive coupler around a coaxial power cable.

FIG. 1 is a diagram of an arrangement of an inductive coupler around a coaxial power cable. It shows an inductive coupler 100 having a magnetic core 105 having an aperture 110 and a secondary winding 115, connected to a communications device 120. A coaxial cable 125, which may be a power cable, has a center conductor 130, a core insulation 135, and a shield (or neutral conductor) 140. A lead, i.e., a drain wire 145, connects shield 140 to ground 146. In the embodiment shown in FIG. 1, cable 125 passes through aperture 110 from left to right, and drain wire 145 passes through inductive coupler 100 from right to left.

Ideally, a magnitude of signal current $I_1$ in center conductor 130 is equal to a magnitude of signal current $I_2$ in shield 140, which is, in turn, equal to a magnitude of signal current $I_3$ in drain wire 145. The net magnetomotive force in inductive coupler 100 due to coaxial cable 125 and drain wire 145 is $I_1$ minus $I_2$ plus $I_3$, which equals $I_1$. This has the effect of electrically "peeling back" shield 140 and providing coupling between the signal current in the center conductor, i.e., $I_1$, and signal current in secondary winding 115, as well as to communications device 120.

Should center conductor 130 be energized at kilovolt potentials, then a high voltage termination device with a stress cone should be placed at each terminus of coaxial cable 125. FIG. 1 does not show such a termination, as the termination does not affect the operation or placement of inductive coupler 100.

Figure 2:
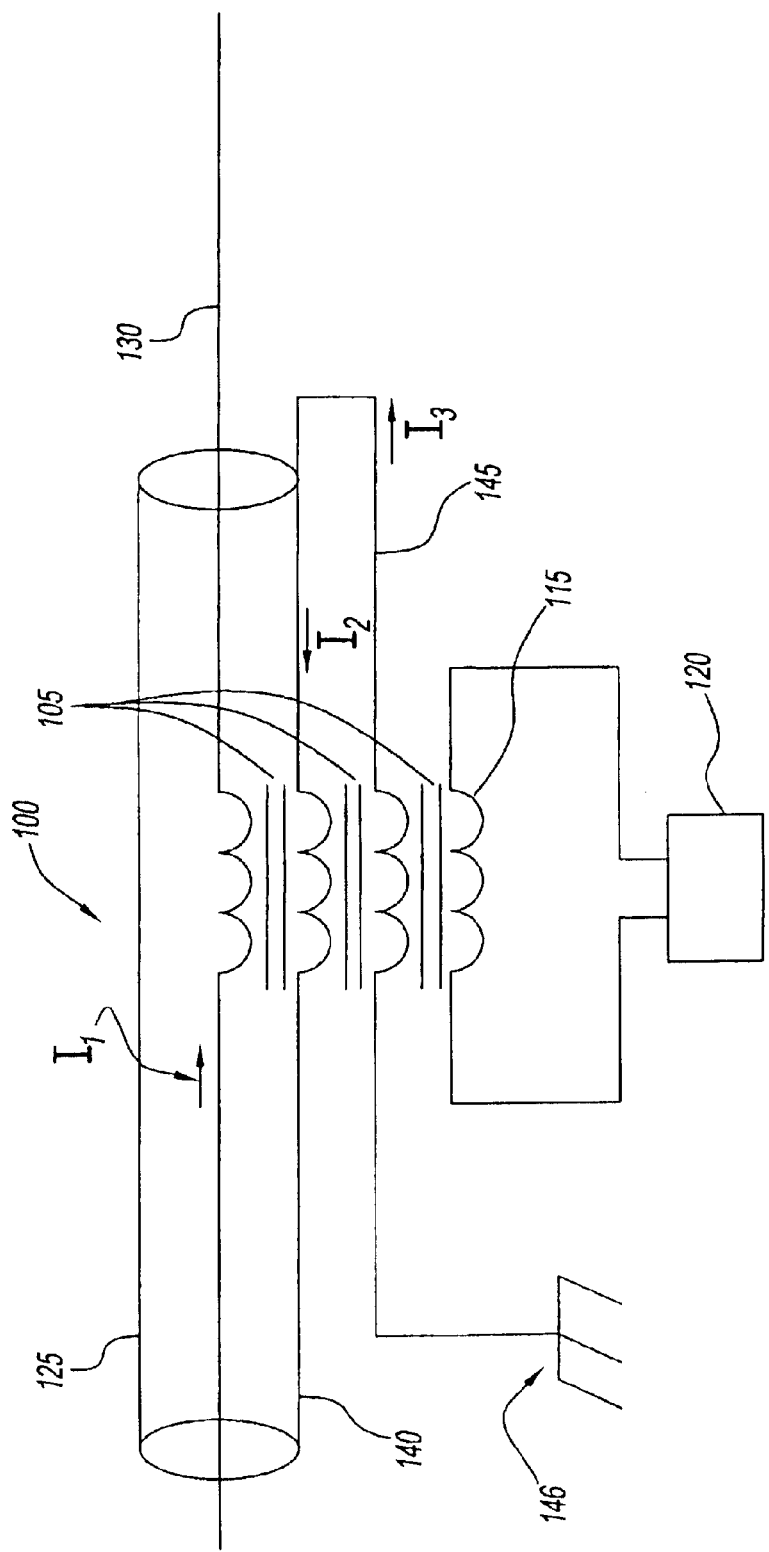
FIG. 2 is a schematic diagram of a circuit for the arrangement of FIG. 1.

FIG. 2 is a schematic diagram of the arrangement of FIG. 1. Again, the sum of currents $I_1$, $I_2$ and $I_3$ through coaxial cable 125 and drain wire 145 is equal to current $I_1$ in central conductor 130.

Should drain wire 145 be passed multiple times through aperture 110, with current $I_3$ flowing in the direction indicated in FIG. 1, then the corresponding sum of currents, including multiples of $I_3$, would yield a signal current in the secondary winding 115 proportional to $I_1$.

Figure 3:
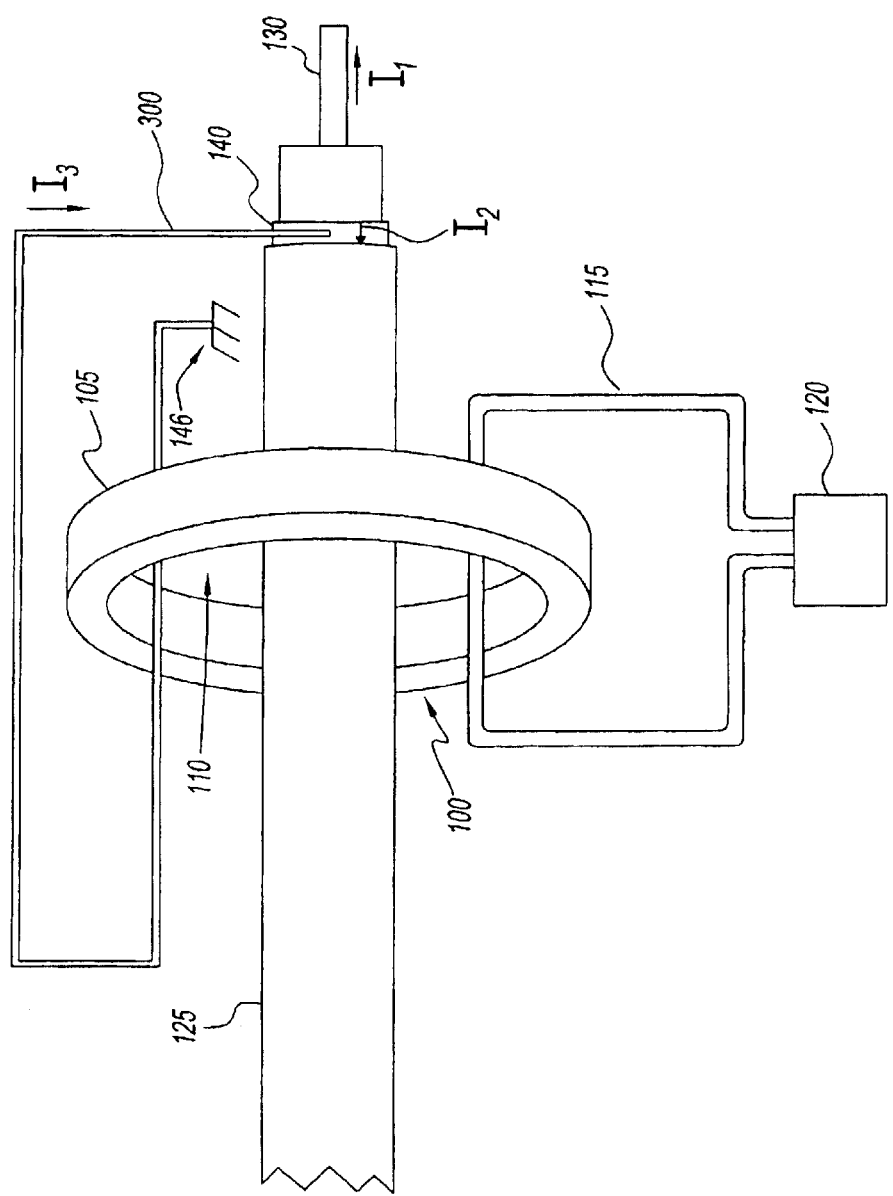
FIG. 3 is a diagram of an alternative arrangement of an inductive coupler around a coaxial power cable.

FIG. 3 is a diagram identical to FIG. 1 except that $I_3$ in a lead, i.e., a drain wire 300, passes through aperture 110 in the same direction as $I_2$. With the magnitudes of $I_1$, $I_2$, and $I_3$ identical to each other, a net magnetomotive force in inductive coupler 100 for the arrangement of coaxial cable 125 and drain wire 300 shown in FIG. 3 is $I_1$ minus $I_2$ minus $I_3$, which equals minus $I_1$. Since inverted phase does not affect a data signal, this arrangement again "peels back" shield 140 to providing coupling between the signal current in the center conductor, i.e., $I_1$, and signal current in secondary winding 115, as well as to communications device 120. By extension, winding drain wire 300 around core 105 more than one time also recovers signal current proportional to $I_1$ or multiples thereof.

The present invention also contemplates coupling a signal to a coaxial cable that is not a power cable. Also, central conductor 130 may be replaced by a plurality of conductors surrounded by any outer shield.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. An arrangement of components for use in a power line communication system, comprising:
   an inductive coupler having a core with an aperture through which a coaxial power cable is routed, wherein said coaxial power cable has a center conductor and an outer conductor; and
   a lead being routed through said aperture, wherein said lead connects said outer conductor to a termination.

2. The arrangement of claim 1,
   wherein said outer conductor provides a path for current in a first direction through said aperture, and
   wherein said lead provides a path for said current in a second direction through said aperture.

3. The arrangement of claim 2, wherein said second direction is opposite to said first direction.

4. The arrangement of claim 1, wherein said inductive coupler couples a communication signal via said center conductor.

5. The arrangement of claim 1, wherein said lead is wound around said core and routed through said aperture a plurality of times.

6. A method for coupling a signal via a coaxial cable for employment in a power line communication system, comprising:
   routing a coaxial power cable through an aperture of a core of an inductive coupler, wherein said coaxial power cable has a center conductor and an outer conductor; and
   routing a lead through said aperture, wherein said lead connects said outer conductor to a termination.

7. The method of claim 6,
   wherein said outer conductor provides a path for current in a first direction through said aperture, and
   wherein said lead provides a path for said current in a second direction through said aperture.

8. The method of claim 7, wherein said second direction is opposite to said first direction.

9. The method of claim 6, wherein said inductive coupler couples a communication signal via said center conductor.

10. The method of claim 6, wherein said lead is wound around said core and routed through said aperture a plurality of times.

11. An arrangement of an inductive signal coupler around a coaxial power cable for use in a power line communication system, comprising:
    an inductive coupler having a core with an aperture through which a coaxial power cable is passed in a first direction; and
    a conductor that terminates an outer conductor of said coaxial power cable, passing through said aperture in a second direction.

12. The arrangement of claim 11, wherein said conductor passes through said aperture a plurality of times in said second direction.

13. A method for coupling a signal via a coaxial power cable for employment in a power line communication system, comprising:
    passing a coaxial power cable through an aperture of a core of an inductive coupler in a first direction, and;
    passing a lead through said aperture in a second direction, wherein said lead terminates an outer conductor of said coaxial power cable.

14. The method of claim 13, wherein said lead is passed through said aperture a plurality of times in said second direction.

15. An arrangement of an inductive signal coupler around a coaxial power cable for use in a power line communication system, comprising:
    an inductive coupler having a core with an aperture through which a coaxial power cable is passed in a direction; and
    a conductor that terminates an outer conductor of said coaxial power cable, passing through said aperture in said direction.

16. The arrangement of claim 15, wherein said conductor passes through said aperture a plurality of times in said direction.

17. A method for coupling a signal via a coaxial power cable for employment in a power line communication system, comprising:
    passing a coaxial power cable through an aperture of a core of an inductive coupler in a direction, and;
    passing a lead through said aperture in said direction, wherein said lead terminates an outer conductor of said coaxial power cable.

18. The method of claim 17, wherein said lead is passed through said aperture a plurality of times in said direction.

* * * * *